March 19, 1935. J. A. SCHMITT 1,995,283
INFLATION TUBE FOR MILKING APPARATUS
Filed July 16, 1928
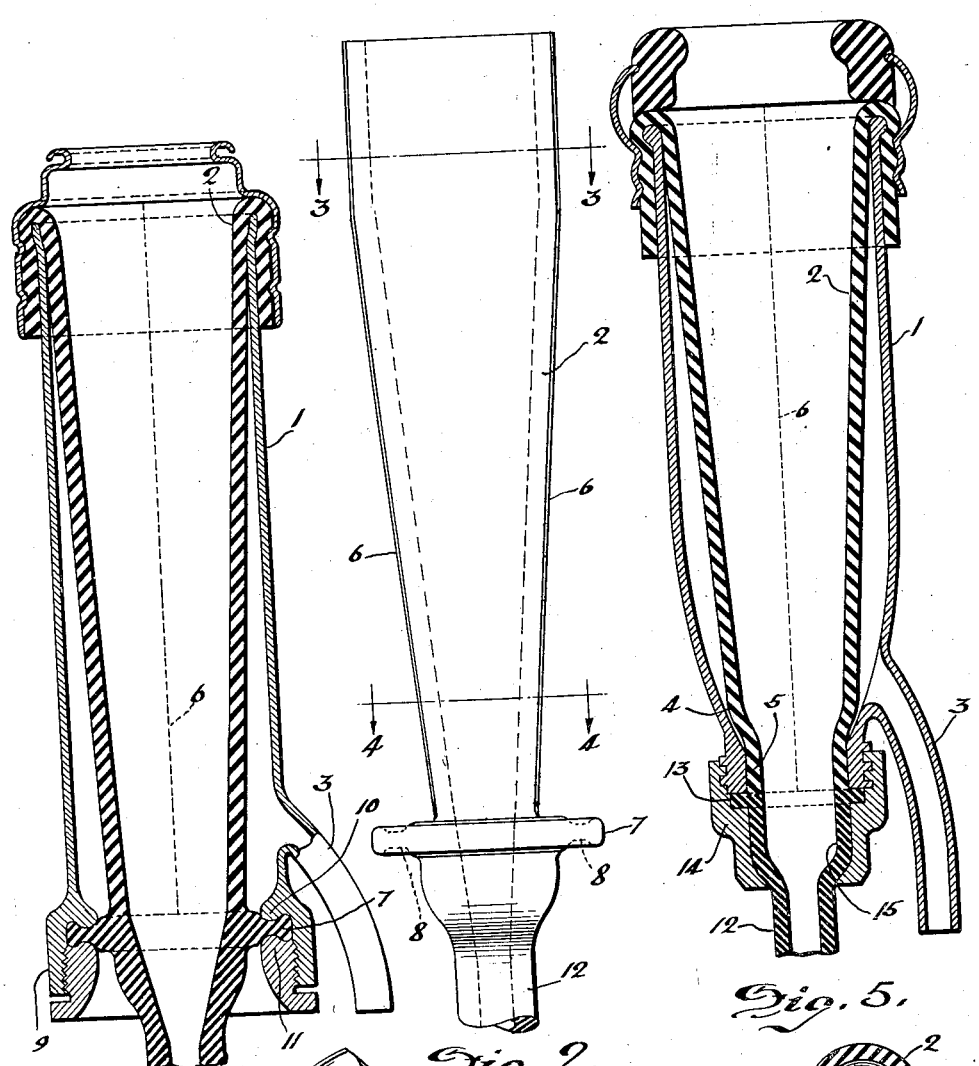

Patented Mar. 19, 1935

1,995,283

UNITED STATES PATENT OFFICE 1,995,283

INFLATION TUBE FOR MILKING APPARATUS

John A. Schmitt, Waukesha, Wis., assignor to The Universal Milking Machine Company, Waukesha, Wis., a corporation of Wisconsin Application July 16, 1928, Serial No. 293,009

8 Claims. (Cl. 31—85)

My invention relates to teat cups for milking apparatus and more particularly to the inflations or pulsating liners therefor and the milk tubes leading therefrom.

For sanitary reasons and convenience of handling, a unitary inflation and milk tube is desirable. Such integral inflation and milk tube units are shown in prior patents, but much difficulty has been experienced in their operation due to their inability to respond to entirely dissimilar conditions of use to which different parts of such unit are subjected.

In the present construction the inflation portion and tube portion are simultaneously and integrally molded from material of different composition whereby the inflation portion will be sufficiently flexible and resilient to respond freely to the pulsating influence and constant flexing motion, while the milk tube will possess the necessary tensile strength to resist pulling strains and more or less rough handling. For economy of manufacture it is desirable to mold the inflation unit in a divided mold which necessarily produces a seam in the finished product. It is found that when the seam portion is subjected to flexing vibration or bending or folding action it is inclined to break. That is to say, the seam area of the molded inflation seems to be more susceptible to breakage and less able to withstand the to and fro bending action. To overcome this difficulty the present inflation is so shaped that the folding or bending action of the inflation walls occurs in a plane at right angles to the plane of the seams or substantially midway therebetween.

The object of the invention is to improve the construction, as well as the means and mode of operation of such teat cup inflations, whereby they will not only be cheapened in construction, but will be more efficient in use, of increased durability, freely responsive to pulsating influence, uniform in action and unlikely to get out of repair.

A further object of the invention is to provide a unitary inflation and milk tube conforming to the dissimilar conditions of use of the different parts.

A further object of the invention is to provide an inflation which may be molded in a split mold, so shaped and arranged that the seam areas of such inflation will be subjected to minimum strain and flexing or bending action.

A further and important object of the invention is to provide an inflation so shaped and arranged as to afford a support to the cow's teat during the milking operation, and whereby the inflation will afford a quicker and improved massage effect, and will more completely release the teat after its compressive movement.

A further object of the invention is to provide improved means for mounting the inflation within the shell or container and to provide means for sealing the engagement of the inflation with such shell and to enable the "take up" or adjustment of the inflation to compensate for stretch and therefore enable the inflation to be kept reasonably tight at all times.

With the above primary and other incidental objects in view, as will more fully appear in the specification, the invention consists of the features of construction, the parts and combinations thereof, and the mode of operation, or their equivalents, as hereinafter described and set forth in the claims.

Referring to the accompanying drawing wherein is shown the preferred, but obviously not necessarily the only form of embodiment of the invention, Fig. 1 is a longitudinal sectional view of the unitary inflation and milk tube forming the subject matter hereof, mounted within the customary shell or container cup. Fig. 2 is an exterior view of the unitary inflation and milk tube viewed at right angles to the position shown in Fig. 1. Fig. 3 and Fig. 4 are transverse sectional views on lines 3—3 and 4—4 respectively of Fig. 2. Fig. 5 is a longitudinal sectional view of a modification. Fig. 6 shows a fragmentary sectional view of another modification.

Like parts are indicated by similar characters of reference throughout the several views.

Referring to the drawing, 1 is the shell or teat cup which is preferably, though not necessarily, of cylindrical tubular form. The lower end of the cup or shell has a sufficiently large orifice to permit the insertion of the inflation through such end. Within the tubular shell or teat cup 1 there is mounted the inflation 2 which is of rubber of highly flexible character, capable of responding freely to the pulsating influence of air alternately admitted to and exhausted from the annular chamber or space intermediate the wall of the inflation 2 and the interior of the tubular cup or shell 1. An air conduit 3 leads to such space through the side wall of the shell 1 through which air is alternately admitted and exhausted by suitable pulsator mechanism.

The inflation portion 2 is of flattened conical form gradually changing from a circular shape at the top to an elliptical or flattened oval shape at its lower end. It is molded in a split mold in such position that the seams coincident with the division line of such mold occur on the flattened sides. The section shown in Fig. 1 is taken on a plane at right angle to the plane of such seams and shows the inflation uniformly tapered on the major axis of the ellipse to the throat at its lower end. Fig. 2 which illustrates the inflation viewed at right angle to the plane of Fig. 1 also shows the inflation tapered downwardly toward its lower end on a minor axis and hence at a somewhat different degree. Such taper terminates at the lower end of the inflation in a tapered throat 4 which on opposite sides conforms to the taper of the inflation as shown in Fig. 2, while at right angle thereto such throat tapers more abruptly than the inflation as shown in Fig. 1. This affords inwardly convergent offsets at the lower end of the inflation as indicated at 4 on two diametrically opposite sides while in a transverse plane the sides of the throat are continuous with the side walls of the inflation. The seams 6 are shown disposed at right angle to the plane of the major diameter of the inflation. While the upper portion of the inflation 2 is of circular form as shown in Fig. 3 the flattened conical shape of the inflation gives to its lower portion a substantially elliptical or oval shape as illustrated in Fig. 4. With the inflation so shaped it is found that the resistance to compression is much less in the plane of the major diameter and at right angles to the plane of the seams 6 than it is in the plane of the seams 6. Consequently the flexing or bending movement occurs substantially in the narrow sides of the inflation and the flattened sides containing the seams 6 tend to approach each other with minimum distortion. By such arrangement the seams 6 are relieved of undue stress and strain and the bending and flexing action occurs approximately midway between such opposite or diametrical seams 6.

Surrounding the neck of the inflation immediately above the tapered throat 4 is a peripheral flange 7 for sealing engagement with the lower end of the shell 1. Formed in the opposite faces of the flange 7 are annular grooves 8. The flange is thus given a substantially "dovetail" shape wherein the peripheral margin of the flange is of greater thickness.

The lower end of the shell or housing 1 is provided with a head 9 having therein an internal laterally grooved flange 10 with which the face of the flange 7 substantially agrees. The head 9 is interiorly screw-threaded to receive a clamp collar or gland 11, the inner face of which is rabbeted or offset to substantially agree with the opposite face of the flange 7. In operation, the inflation is subjected to various strains and stresses which tend to unseat the engagement of the inflation with the shell and permit leakage of air. However, by clamping the marginally enlarged flange 7 between the flange 10 and collar 11 which are shaped to grasp the annular dovetail form of the inflation flange 7 the latter is effectively held against withdrawal or loosening. The collar 11 is peripherally knurled or made of polygonal shape to facilitate its engagement and disengagement by hand operation. Beyond the flange 7 the unit is continued in the form of an integral flexible hose or tube 12. While the inflation portion 2 of the unit contained within the shell 1 and subjected to more or less vibratory or pulsating motion is formed from a comparatively pure rubber, possessing a considerable degree of elasticity and which is sometimes known in the rubber trade as "pure floating stock". Such material when used for the tubing or hose 12 breaks very easily. This hose 12 must be applied to and pulled off the spud or connection leading to the milk receiver at frequent intervals. The rubber or other material of elastic character suitable for the inflation will not withstand such pulling strain and the more or less hard usage to which the tubing or hose head is ordinarily subjected in use. Consequently the material used for the tube 12 is of somewhat different character, possessing less elasticity but greater tensile strength.

It has been found in practice that material of this character will not properly function when used for the inflation tube. Therefore, in constructing the present unitary inflation and milk tube material of different characteristics suitable to meet the requirements of the dissimilar conditions of use are employed for the inflation head and the milk tube portions. In practice, red rubber is preferably employed for the tube 12, while soft grey rubber is used for the inflation. These materials are simultaneously molded, the materials blending one into the other at approximately the position of the peripheral flange 7. This feature of molding the unitary inflation and milk tube from two characteristically different compositions of material will meet the different conditions of use and has overcome the fundamental objections to the unitary inflation and milk tube, which, although known, has never gone into very extensive commercial use.

In assembling the inflation within the teat cup or shell 1, the larger end of the inflation is inserted through the lower end of the teat cup tube 1 and is drawn therethrough until the peripheral flange 7 bears firmly against the flange 10 and is then clamped by the collar 11 with the enlarged margin firmly seated in the annular groove of the flange 10. The upper end of the inflation is then turned reversely over the upper end of the tube or shell 1, whereby by its elasticity it grasps the top of the shell to form a second air tight joint. By drawing the inflation more or less strongly before reversing it the tension of the inflation walls may be properly adjusted and any slack or stretch which may occur after a period of use can be taken up or compensated for.

By disposing the seam 6 at the point of minimum distortion and causing the folding or bending action to occur in a plane at right angles to the diametrical disposition of the seams 6 there will be but little bending movement and practically no strain on such seam portions and the bend or fold will occur on lines distantly spaced therefrom. This insures a much longer period of usefulness and a greater uniformity of action of inflation. Moreover, this shape of the inflation has a further function of supporting the teat more comfortably and securing during the milking operation. The flattened sides of the conical inflation being thus normally much closer to the teat than would be the case when using the usual round inflation, these flat sides in which the seams occur have a much less range of movement having ordinarily approximately a quarter of an inch deflection.

This, therefore, insures quicker action when the released air enters the shell or cup 1 and affords a better massage action. It also has the effect of a more complete release upon the teat as the inflation expands.

As a modification of a construction heretofore described there is shown an inflation milk tube unit having a reverse conical portion 11, as best seen in Fig. 6, in lieu of the peripheral flange 7. This conical portion 11' is seated in the lower open end of the teat cup tube or shell 1 when the inflation is assembled, where it tightly engages somewhat in the same manner as a bottle stopper except in the present instance such tapered portion has a central bore therethrough forming the interconnecting passage between the milk tube 12 and inflation 2. By drawing such tapered portion 11' into the end of the shell or tube 1 an airtight joint may be effected. This construction has the advantage of less offset grooves and angles in which milk or sediment may accumulate and is therefore more easily cleaned and is also a more convenient shape for molding.

In Fig. 5 the invention is shown applied to a conventional type of teat cup shell or housing wherein the lower end of the shell is too small to permit the introduction of the inflation. The type of shell illustrated is that shown in patent to Schmitt 1,388,380 of August 23, 1921. In such construction the inflation is necessarily inserted from the top and the lower end is pulled through the reduced orifice of the shell. The shape of the inflation is the same general shape as before described, except that in the plane of its maximum diameter the inflation is rather abruptly contracted at its lower end forming an offset or shoulder as at 5. In its transverse aspect the inflation tapers uniformly as shown in Fig. 2. In lieu of the extended peripheral flange having annular grooves in the opposite faces there is provided in the present form a reduced annular bead or collar 13 which is clamped to the end of the shell or housing by the terminal head 14. In order that the unit may be sufficiently flexible to permit the collar or bead 13 to collapse when passed through the restricted orifice of the shell the enlarged chamber or continuation of the chamber of the inflation is carried beyond the collar or bead 13 as indicated at 15 before being contracted to the dimension of the milk tube 12. This enlarged bore at the point 15 affords greater flexibility and facilitates the contraction of the collar 13 in passing through the end of the housing.

From the above description it will be apparent that there is thus provided a construction of the character described, possessing the particular features of advantage before enumerated as desirable, but which obviously is susceptible of modification in its form, proportions and arrangement of parts, without departing from the principle involved or sacrificing any of its advantages.

While in order to comply with the statute the invention is described in language more or less specific as to structural features, it is to be understood that the invention is not limited to the specific details shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A teat cup inflation comprising a flexible tubular body of substantially elliptical conical form having seams on its diametrically opposite sides in the plane of the minor axis, said body being adapted thereby to effect its bending movement incident to its pulsating action upon lines substantially mid distant between said seams so as to prevent failure of the tube along the seams.

2. A teat cup inflation comprising a flexible tubular body of substantially conical form flattened on its diametrically opposite faces, the seams of said body being disposed upon such flattened faces.

3. A teat cup inflation comprising a flexible tubular body of conical form, and mold seams formed on its diametrically opposite sides, the maximum bending movement of the body incident to its pulsating action being confined to the wall portions of the body substantially in a diametrical plane perpendicular to the plane of said seams.

4. A teat cup inflation comprising a flexible tubular body of conical form flattened on its opposite faces and having diametrically opposite mold seams in said flattened faces, the maximum bending movement of which incident to its pulsating action is confined to its wall portions removed from the plane of said seams.

5. The combination with a tubular teat cup shell, of a one-piece inflation and milk tube, an external peripheral flange thereon in proximate relation with the point of transition of the unit from inflation to milk tube for sealing engagement with one end of the shell, and clamp means on the shell between which said external peripheral flange is detachably engageable, the opposite faces of the flange being concentrically grooved for cooperative engagement of the clamp means.

6. A teat cup inflation having a pulsating action, said inflation comprising a flexible, tubular body, the upper portion of which is substantially circular in cross section, from which the body tapers downwardly so as to form a tubular body of substantially elliptical, conical form, the taper along the major axial plane being less than the taper along the minor axial plane, so that the bending movement incident to its pulsating action is effected upon lines adjacent to the major axis.

7. A teat cup inflation having a pulsating action, said inflation comprising a flexible, tubular body having an upper end portion and a lower end portion, each of which is substantially circular, the one being larger than the other, and an intermediate portion tapering uniformly along an axial plane from the upper end to the lower end and tapering uniformly in an axial plane normal to said first plane but less than the first taper so as to have an elliptical cross-sectional form throughout the intermediate portion, the maximum bending movement incident to its pulsating action taking place in proximate relation with the intersection of the plane of the major axis of said elliptical portion, the molded seams of the intermediate portion extending substantially in the plane of the minor axis so as to protect the seams from excessive bending.

8. A teat cup inflation having a pulsating action, said inflation comprising a flexible, tubular body, the upper and lower portions of which are substantially circular, the upper portion being larger than the lower, and an intermediate portion tapering uniformly along an axial plane from the top portion to the lower portion, and tapering uniformly in an axial plane normal to said first plane for a portion of the distance to the intermediate portion and changing its taper adjacent one end portion so that the intermediate portion has a substantially elliptical cross-sectional form, the seams of the intermediate portion lying substantially at the intersection of the minor axial plane of said ellipse with the walls of the body so as to protect the seams by the maximum bending movement taking place adjacent to the major axis.

JOHN A. SCHMITT.